US006792097B2

(12) United States Patent
Bakke

(10) Patent No.: US 6,792,097 B2
(45) Date of Patent: Sep. 14, 2004

(54) SYSTEM AND METHOD FOR IMPLEMENTING TELEPHONY CALL CONTROL VIA A SET OF COMPONENTS THAT COMMUNICATE WITH EACH OTHER VIA A UNIQUE TELEPHONY PROTOCOL

(75) Inventor: Stephen P. Bakke, Dallas, TX (US)

(73) Assignee: VocalData, Inc., Richardson, TX (US)

( * ) Notice: Subject to any disclaimer, the term of this patent is extended or adjusted under 35 U.S.C. 154(b) by 0 days.

(21) Appl. No.: 10/406,092

(22) Filed: Apr. 2, 2003

(65) Prior Publication Data

US 2003/0169732 A1 Sep. 11, 2003

Related U.S. Application Data

(63) Continuation of application No. 09/291,827, filed on Apr. 14, 1999.

(51) Int. Cl.[7] ................................................ H04M 7/00
(52) U.S. Cl. .................. 379/219; 379/220.01; 379/229
(58) Field of Search ......................... 379/201.06, 201.1, 379/207.02, 207.04, 207.05, 207.06, 207.07, 215.01, 221.08, 230, 219, 229, 220.01

(56) References Cited

U.S. PATENT DOCUMENTS 4,081,611 A * 3/1978 Bovo et al. ................. 370/244
5,553,127 A    9/1996 Norell
5,588,044 A   12/1996 Lofgren et al.
5,621,789 A    4/1997 McCalmont et al.
5,673,261 A    9/1997 Tjabben et al.
5,742,596 A    4/1998 Baratz et al.
5,802,145 A *  9/1998 Farris et al. ............. 379/32.03
5,812,751 A    9/1998 Ekrot et al.
5,870,464 A    2/1999 Brewster et al.
5,996,086 A   11/1999 Delaney et al.
6,118,862 A    9/2000 Dorfman et al.
6,134,313 A   10/2000 Dorfman et al.
6,226,289 B1 * 5/2001 Williams et al. ............ 370/385
6,377,673 B1 * 4/2002 Cho et al. ............. 379/201.01

OTHER PUBLICATIONS

Cronin, Paul, "An Introduction to Tsapi and Network Telephony", IEEE Communications Magazine, Apr. 1996 pp. 48–54.

* cited by examiner

Primary Examiner—Bing Q. Bui
(74) Attorney, Agent, or Firm—Vinson & Elkins L.L.P.

(57) ABSTRACT

Telephony call control functionality is divided into a set of components. Each component provides a specific portion of the call control. The components communicate with each other via a unique telephony protocol. The unique telephony protocol is defined as a set of events. A component sends/receives events to other components that are involvement in a call. Sets of components are located together on telephony servers. Because communication between components is via a protocol, the components may be located on many different servers.

19 Claims, 6 Drawing Sheets

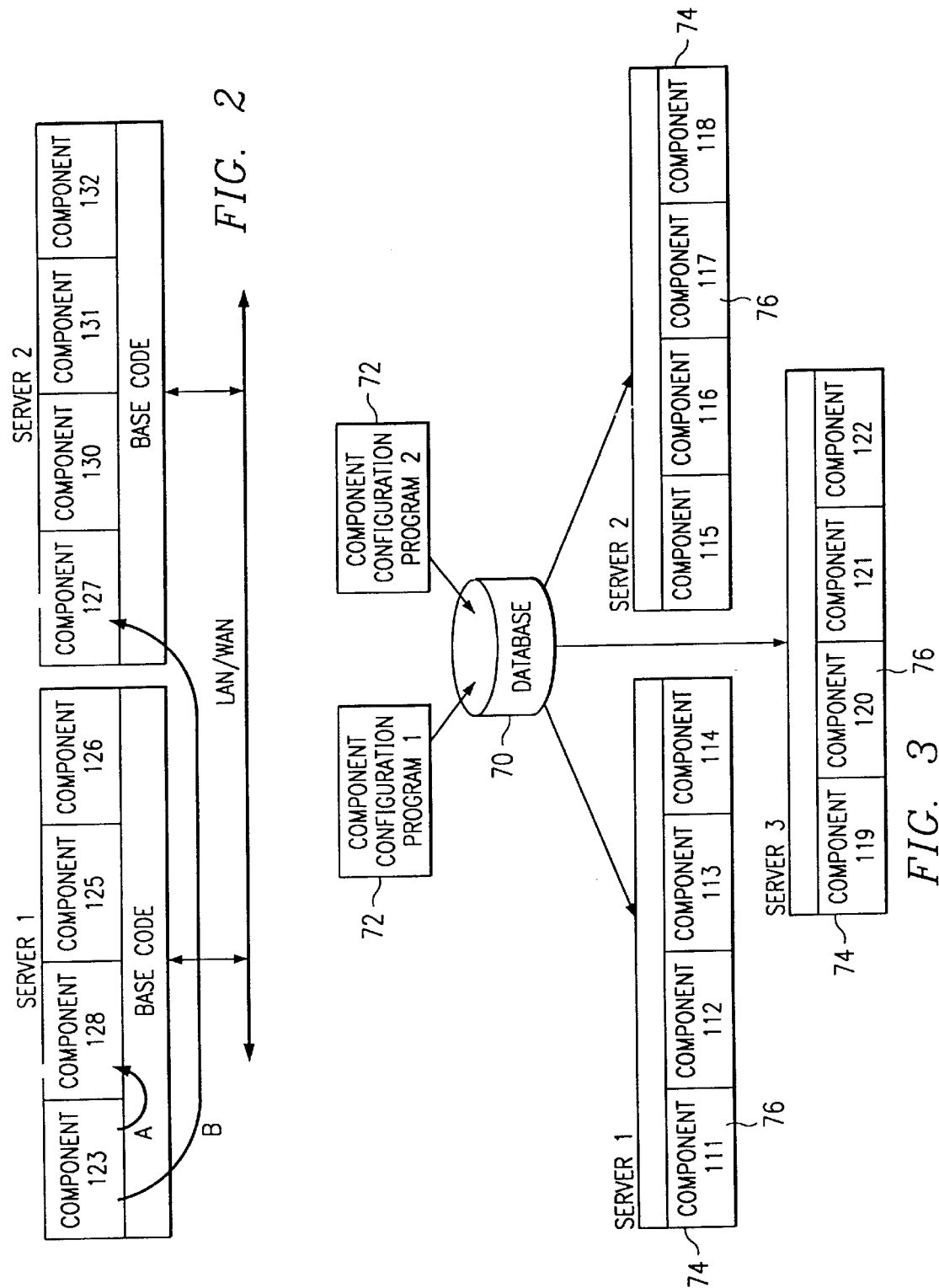

SYSTEM AND METHOD FOR IMPLEMENTING TELEPHONY CALL CONTROL VIA A SET OF COMPONENTS THAT COMMUNICATE WITH EACH OTHER VIA A UNIQUE TELEPHONY PROTOCOL

This application is a continuation of Ser. No. 09/291,827 filed Apr. 14, 1999.

TECHNICAL FIELD OF THE INVENTION

The present invention relates in general to telecommunications call processing and more particularly to a system and method for implementing telephony call processing functionality in a distributed manner over a local area network.

BACKGROUND OF THE INVENTION

Traditional telephony call control applications (such as private branch exchanges (PBX), and central office (CO) exchanges are proprietary monolithic software applications. The ability for outside vendors to customize and integrate into these applications has been very limited. Computer Telephony Integration (CTI) in the PBX market and Intelligent Networking (IN) in the central office market are the methods used today to provide limited third party control of these applications.

CTI provides an ability for a third party application running on a server to control certain elements of a PBX. In a this environment, the Computer is the server running the third party application, the Telephony is the PBX and the Integration is the coordination performed between them. However, the amount of control a third party CTI application has is at the total discretion of the PBX manufacturer. For example, if the proprietary telephony application has not been designed to allow a feature to be externally controlled, then the third party CTI application cannot provide that functionality. Generally, only a single third party application can control a PBX. Further, the most prevalent types of CTI environments are application programming interface based proprietary solutions and therefore separate versions of the CTI application must be written for the various CTI environments.

IN provides a method for third party applications to provide functionality to control certain aspects of the operation of the CO. Through a set of triggers and events, third party functionality can be invoked at desired times in the call flow. Because of the CO environment, this is a very complex method and generally only the telephony company that owns the CO exchange creates these applications. A business who receives service from the CO exchange may desire some special functionality but is not allowed to provide it.

Therefore, it is desirable to provide the capability for a third party application to control a PBX that is not constrained by the PBX vendor and allows outside vendors to customize and integrate into PBX application.

SUMMARY OF THE INVENTION

From the foregoing, it may be appreciated that a need has arisen for a capability to implement telephony call control in an environment that multiple vendors can integrate and control any and all call functionality. In accordance with the present invention, a system and method for implementing telephony call control via a set of components that communicate with each other via a unique telephony protocol is provided that substantially eliminates or reduces disadvantages and problems associated with conventional CTI and IN call control.

According to an embodiment of the present invention there is provided a system for implementing telephony call control functionality via a set of software components. Together the set of components provide the overall call control for the system. The set of components may be all executing on a single server or maybe distributed among multiple servers. The set of components may be designed by a single vendor or multiple vendors. When distributed among multiple servers, the components communicate via a unique telephony protocol.

The present invention provides various technical advantages over conventional methods of providing telephony call control. For example, one technical advantage is that the original telephony application and all third party applications are treated as equals. One or many third party applications can work along side the original call control application and provide any desired functionality. Another technical advantage is that, since components can reside on multiple servers, additional functionality can be added on another server and not interfere with the operation of existing applications. Yet another technical advantage is that it is easy to have the same components running on two servers and the servers provide redundancy for each other in the case of failure. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 2 illustrates a simplified block diagram of how components communicate within a single server and between servers using the unique telephony protocol over a network;

FIG. 3 illustrates a simplified block diagram of how components are configured;

DETAILED DESCRIPTION OF THE INVENTION

Figure 1:
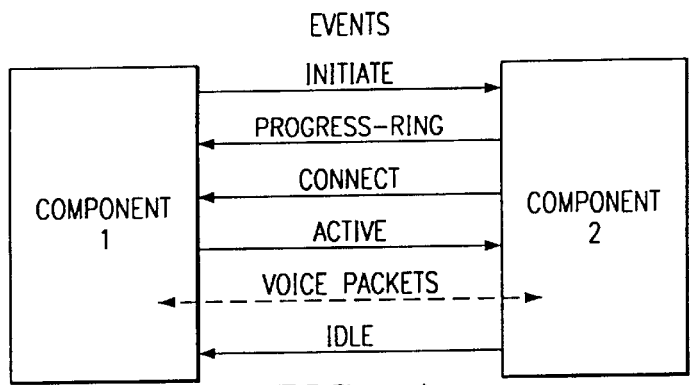
FIG. 1 illustrates the basic operation of a component.

FIG. 1 shows a basic operation between two components. Components are independent pieces of software that create the building blocks for telephony applications. Components are generally simple, single purpose entities. For example, a phone component contains the functionality that controls a telephone while a line component contains the functionality that provides a line on the telephone. It is also possible to create a component that represents a complete subsystem such as a voicemail system. However, in order to create flexible solutions, it is preferable to keep components simple and have subsystems made up of many components.

Components exchange call information with other components via a unique telephony protocol. This telephony protocol is comprised of a set of messages or events that flow between components. The exact method of formatting each event into a packet and sending the packet to another component is what defines the unique telephony protocol. A piece of software is considered a component if it can communicate via this unique telephony protocol.

For the example shown in FIG. 1, Component 1 first sends an Initiate event to Component 2. The Initiate event informs Component 2 that there is a call available for it. Next Component 2 replies with a Progress dial tone event informing Component 1 that the call is being processed. For example, Component 2 may be ringing a telephone and waiting for it to be answered. When Component 2 receives an indication that the telephone has been answered, it responds with a Connect event that notifies Component 1 that the call is being accepted. Component 1 responds with an Active event that informs Component 2 that the call is in the talk state. The two components now start sending voice packets to each other. When Component 2 receives an indication that its associated telephone has been placed on-hook, it sends an Idle event to Component 1 indicating the end of the call.

Table 1 shows examples of types of events and their respective descriptions, included in messages between components. The first seven examples of events notify components about some aspect of a call. The last three examples of events are used for housekeeping operations. All events have a common set of parameters and some events have their own unique parameters. Examples of common parameters include source, destination, and an identification that specifies which call an event is associated with.

TABLE 1

| EVENT | DESCRIPTION |
| --- | --- |
| Initiate | Start a new call |
| Progress | Response to Initiate: request digits, ring |
| Connect | Response to Initiate: Call is answered |
| Active | Response to Connect: start sending voice |
| Digits | Digits generated |
| Idle | End of call |
| Redirect | Hand call of to another Component |
| Info | Request info from a Component |
| Database | Response Component info from Config Db |
| Mirror | Exchange information with the identical Component running on another |
| Error | Error has occurred |

Table 2 shows examples, and their descriptions, of some of the components.

TABLE 2

| COMPONENT | FUNCTION |
| --- | --- |
| Call | Call Components are created dynamically, one for each call. The Call Component hands-off events between source and destination Components that are involved in a call, logs call detail information (CDR), and performs operations such as call redirect and transfer. |
| Database | The Database Component provides the interface to the Configuration database. The Database Component only sends and receives Database events. When a Component "boots," it reads its configuration data from the Database Component. A Configuration Program(s) writes information to the Database Component. The actual database behind the Database Component can be any type of database (SQL, LDAP, etc.) . The Database Component "hides" the type of database from the other Components. |
| Telephone | The Telephone Component controls a physical telephone. It sends/receives events from Line Components on one end and communicates with the telephone on the other end. For example, when an Initiate event is received from a Line Component, the Phone Component sends 'LED ON' and "RING PHONE' commands to the telephone. |
| Line | A Line Component represents one line in a PBX. Line Components send/receive events on one side from the Call Component and send/receive events on the other side from one or more Phone Components (phones that have line appearance associated with them). |
| Announcement | The Announcement Component plays a file from disk. When the Announcement Component receives an Initiate event, it immediately answers the call, reads the associated file from disk, and starts sending voice packets at the precise packet frame rate. When the file has been totally sent, an Idle event is sent. |
| Voice Mail | The Voice Mail Component represents a voice mailbox. |
| IP Gateway | The IP Gateway Component is similar to the IP Telephone Component except that it controls an IP gateway using the IPDC protocol between the gateway and the Component. |
| H.323 | The H.323 Component is similar to the IP Gateway Component, except that it communicates with an H.323 device or gateway using the H.323 protocol. |

FIG. 2 shows an example of how components communicate within a server and between servers. Two servers, server 1 and server 2, may be connected via a local or wide area network LAN/WAN. All components have a globally unique identification associated with them. When sending events, a component's identification is the destination for the event. In the example of FIG. 2, Component 123 is sending two events, Event A and Event B. Event A is sent to Component 128 on the same server, Server 1. Event A simply travels down to the common base code of Server 1 and then up to Component 128. There is no need for Event A to go out over the network as Event A is routed from one component to another within the same server. Event B is being sent to Component 127 on another server, Server 2, over a communication medium such as the LAN/WAN where it is delivered to Component 127 through the common base code of Server 2. Since Event B travels over the network, Event B is packaged up into a packet and sent to Server 2 using the unique telephony protocol. From Component 123's point of view, there is no difference between sending the two events. An event is created and then sent to a destination component and the common base code takes care of delivering the event either locally within the same server or over the network to a different server using the unique telephony protocol.

FIG. 3 is a simplified block diagram of how components are configured within a network. Each component within the network is configured with at least one piece of information, the other component or components it needs to communicate with. For example, a trunk component needs to know to which component an Initiate event is to be sent when the trunk rings. Another aspect of component configuration is specifying the various properties that each component may utilize. For example, a trunk component has digit type and seize time properties. A database 70 holds the component configuration data while one or more component configuration programs 72 write configuration information into database 70. Servers 74 that contain the components read the configuration information from database 70 and initializes individual components 76 associated therewith. Database 70 may be treated as a component itself and component configuration program 72 and server 74 may communicate with database 70 using a database event type.

Figure 4A:
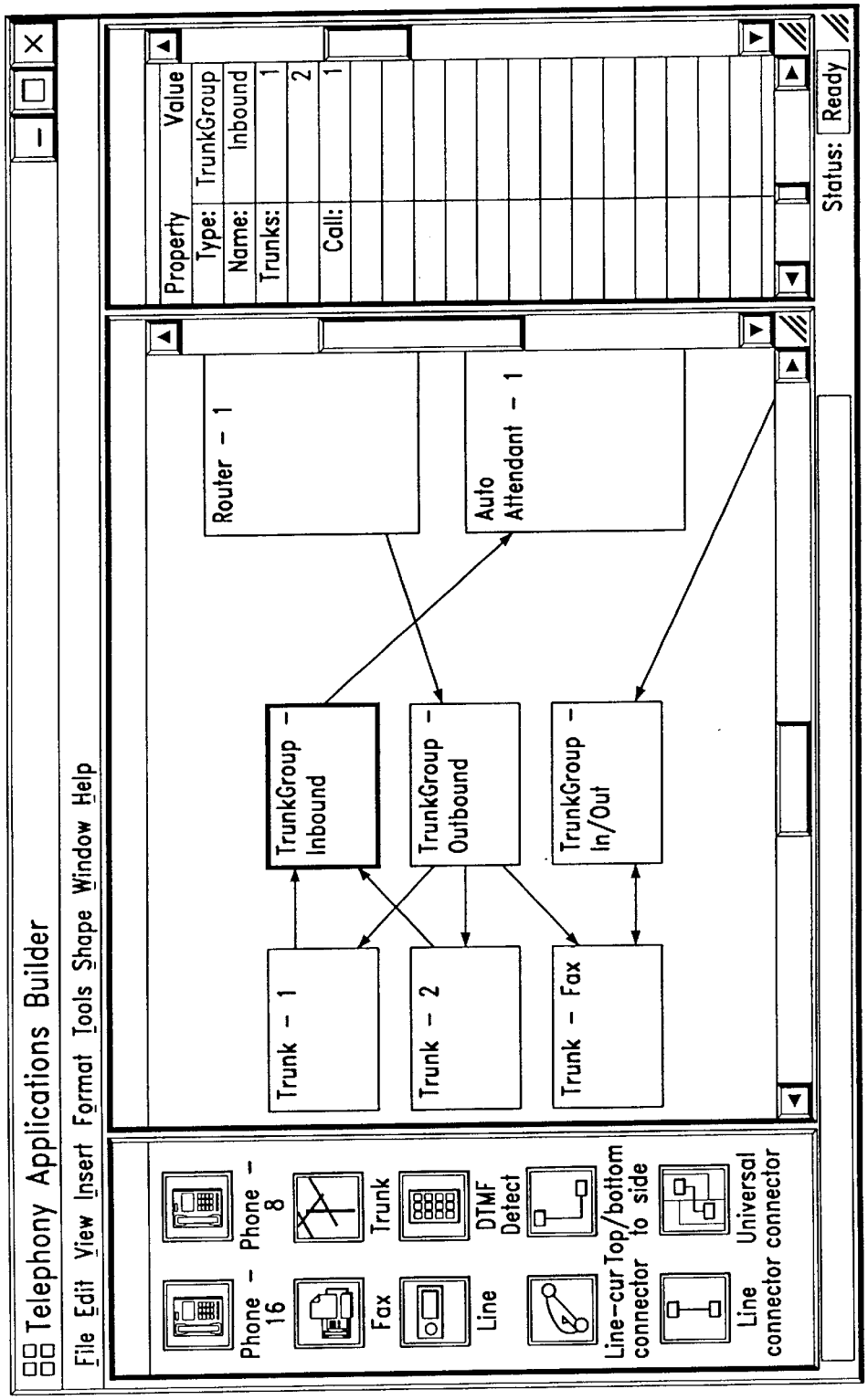
FIGS. 4A and 4B illustrate examples of programs used to configure components.
Figure 4B:
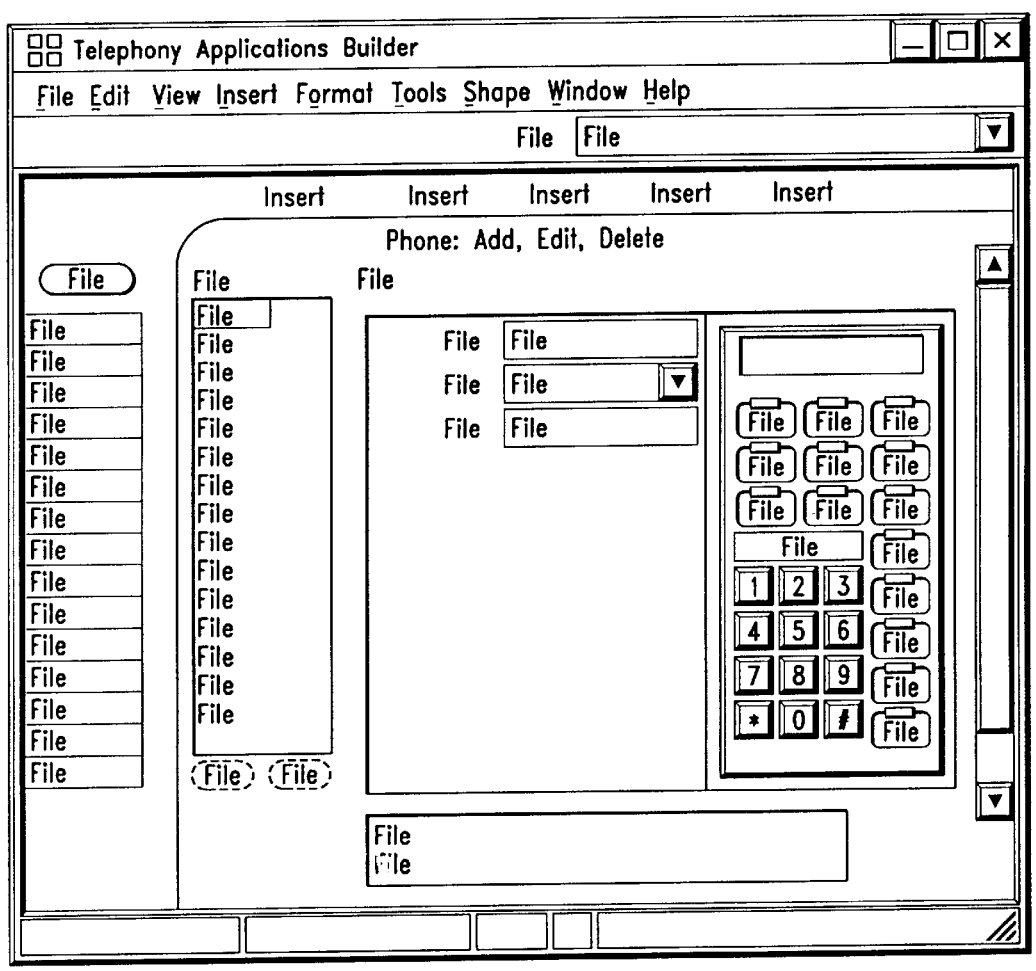

FIGS. 4A and 4B show examples of configuration programs. Configuration programs may come in various forms for use by different types of users. For example, FIG. 4A shows an example of a simple telephony applications builder program that is being used to create a private branch exchange (PBX) application. On the left hand side of the program screen are the component types that can be used to build a PBX application. The middle of the program screen is an editor area in which the PBX application can be built from the component types in the left hand portion of the program screen. On the right hand side of the program screen are the properties for the currently selected component highlighted in the editor area. The properties can be created and changed as desired by the program operator. In this type of configuration program, the operator creates the application at the component level and therefore has an understanding of each and every component type in the configured system.

FIG. 4B shows an example of a configuration program for the PBX application. In this type of configuration program, the operator performs an operation, for example adding a line to a telephone, and then the configuration program automatically creates and configures new and affected components. In this example, the operator has no knowledge of what the components are in the configured system. In this manner, normal administration functions may be simply performed. Though shown with reference to a PBX application, either of the configuration program examples may function with any desired telephony application including, for example, an Interactive Voice Response (IVR) application.

Figure 5:
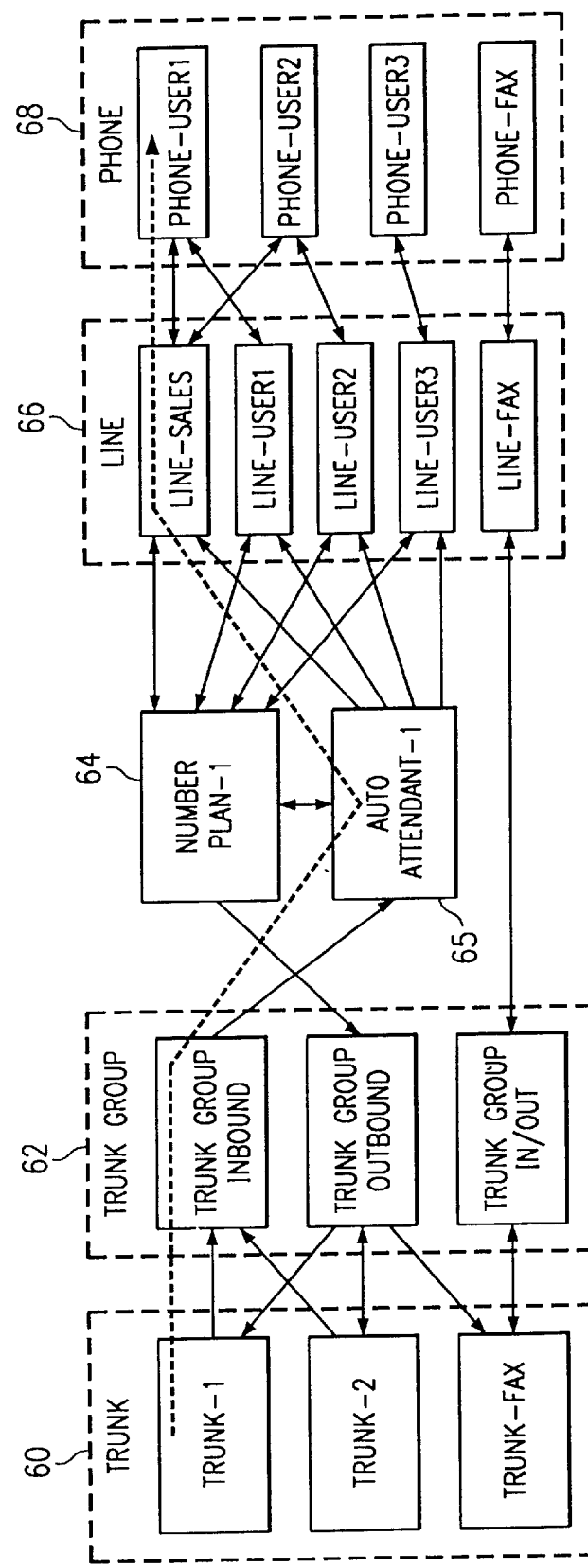
FIG. 5 illustrates an example of the components required and how they are configured to provide private branch exchange functionality.

FIG. 5 shows an example of the components used to create a simple PBX consisting of three trunks and four phones. For the example of FIG. 5, the component types represented include trunk components 60, trunk group components 62, router component 64, auto attendant component 65, line components 66, and phone components 68.

As shown, components are labeled with a component type and an instant name. For the trunk components 60, there are three different instances: TRUNK-1, TRUNK-2, and TRUNK-FAX. For the trunk group components 62, there is an inbound trunk group TRUNK GROUP-INBOUND component, an outbound trunk group TRUNK GROUP-OUTBOUND component, and an inbound/outbound trunk group TRUNK GROUP-IN/OUT component. There is one router component 64, the NUMBER PLAN-1 and one auto attendant component AUTO ATTENDANT-1. Line components 66 includes five instances—SALES, USER1, USER2, USER3, and FAX. Phone components 68 include four corresponding phone instances for USER1, USER2, USER3, and FAX.

The solid lines show the event flow between components while the dashed line shows a typical communication path for a call through the PBX configuration. Though not shown there is a call component that is created for each call through the PBX configuration.

Figure 6:
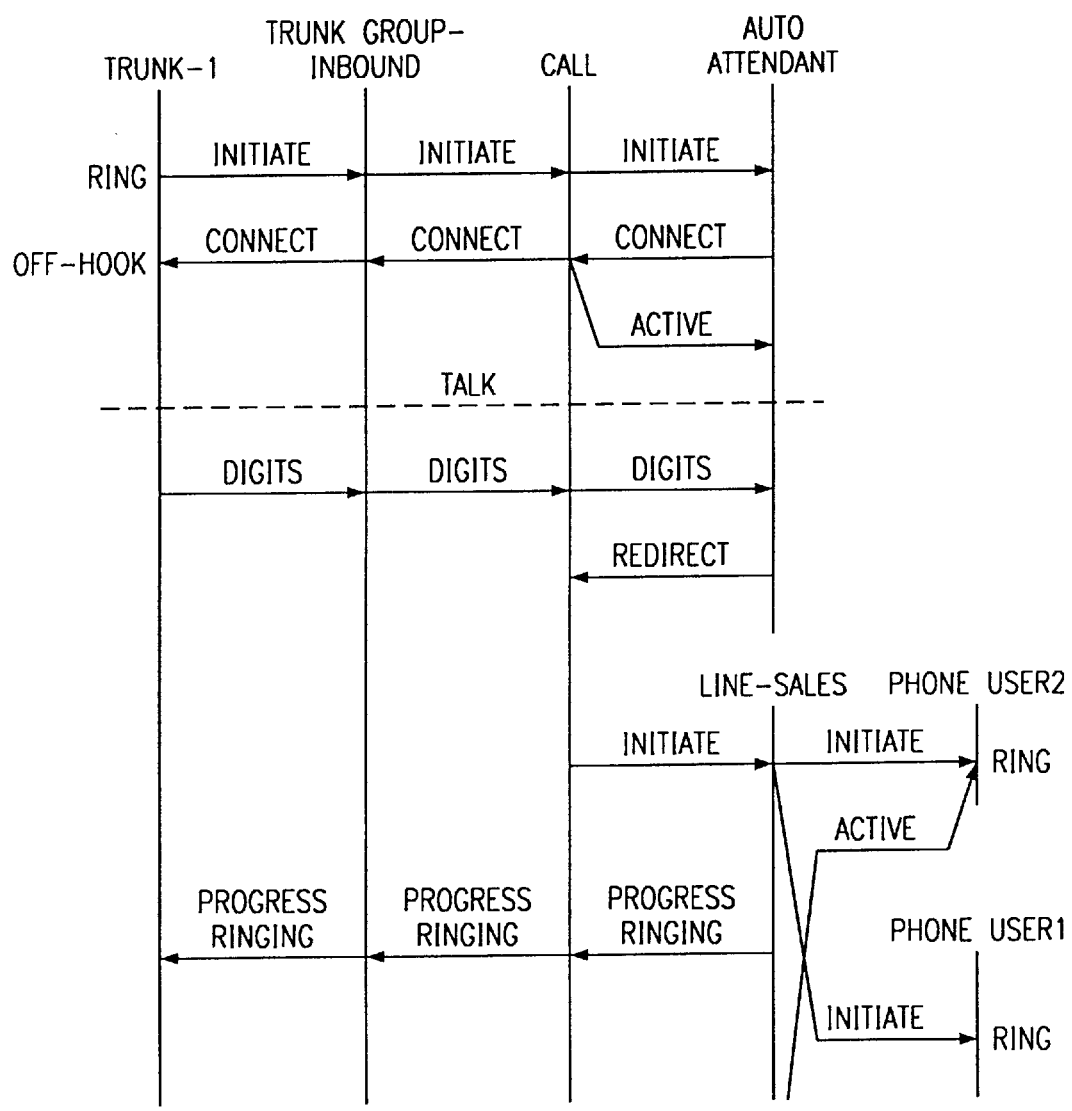
FIG. 6 illustrates event interaction between components for a typical voice call.

FIG. 6 shows the event interaction between components for a typical call example in the PBX configuration of FIG. 5. In this example, trunk component TRUNK-1 receives a ringing signal and generates an Initiate event to trunk group component TRUNK GROUP-INBOUND. TRUNK GROUP-INBOUND passes the Initiate event to the call component CALL-X which in turn passes the Initiate event to the auto attendant AUTO ATTENDANT-1. In this example, the business subscriber desires that an auto attendant handle all calls initially upon receipt. The auto attendant AUTO ATTENDANT-1 responds with a Connect event that is passed to the call component CALL-X and successively through the inbound trunk group component TRUNK GROUP-INBOUND and the trunk component TRUNK-1. The call component CALL-X responds with an Active event to the auto attendant AUTO ATTENDANT-1 in order to pass call control processing thereto.

Once the trunk component TRUNK-1 receives the connect event, it requests the necessary digits from the originator of the call as required by the auto attendant AUTO ATTENDANT-1 in order to complete the desired call. Digits are passed from the trunk component TRUNK-1 to the trunk group component TRUNK GROUP-INBOUND to the call component CALL-X and then to the auto attendant AUTO ATTENDANT-1 for processing. The auto attendant AUTO ATTENDANT-1 determines the destination of the call from the digits received and, in this case, provides a Redirect event to the call component CALL-X in response to the destination of the phone call being to the sales line of the business subscriber.

The call component CALL-X regains control of the call processing and provides an Initiate event to the line component SALES. The line component SALES institutes a Progress Ringing event to the call component CALL-X that is passed on to the trunk group component TRUNK GROUP-INBOUND and the trunk component TRUNK-1 in order to inform the originator of the call that the destination phone is ringing. The line component SALES also provides an Initiate event to its associated phone components USER1 and USER2 upon which their respective phones begin to ring. When one of the phones is answered, in this case USER1's phone, phone component USER1 provides a Connect event to the line component SALES in response to the off-hook condition. The line component SALES passes the Connect event on to the call component CALL-X, the trunk group component TRUNK GROUP-INBOUND, and the trunk component TRUNK-1 to inform the originator of the call that the phone has been answered. The call component CALL-X generates an Active event for the line component SALES which is passed on to the phone component USER2 and the phone component USER1. The call path has now been established and the voice call proceeds until one of the parties to the call returns their phone to the on-hook state.

When the phone component USER1 detects an on-hook condition, an Idle event is generated that passes through the line component SALES, the call component CALL-X, trunk group component TRUNK GROUP-INBOUND, and trunk component TRUNK-1. Since the line component SALES is associated with two phone components, an Idle event is also passed from the line component SALES to the phone component USER2.

Figure 7:
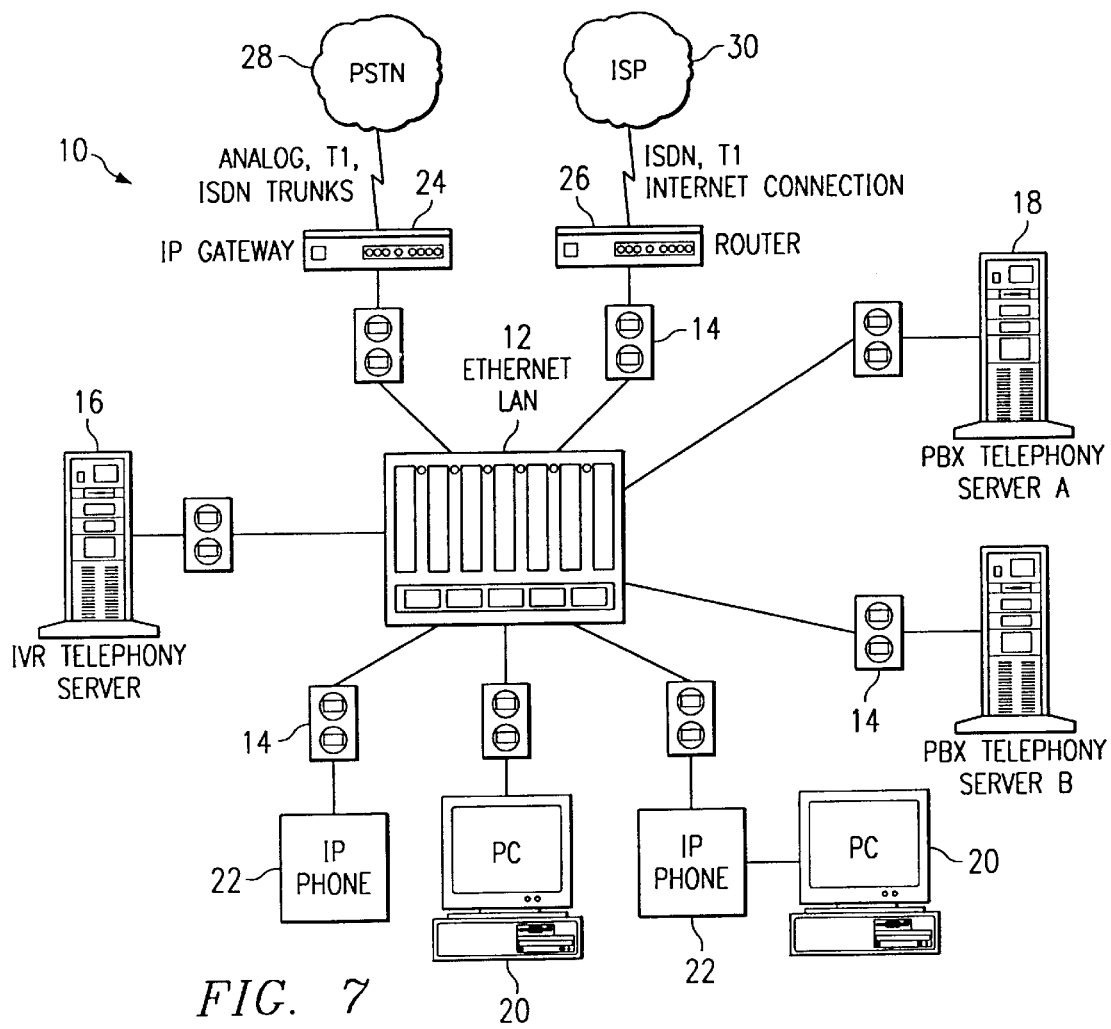
FIG. 7 illustrates a block diagram of a typical IP based telephony PBX application using components distributed among three servers.

FIG. 7 is a block diagram of a typical use of the invention in an Internet Protocol (IP) based PBX which provides telephony functionality over a local area network 10. Components may be running on multiple separate servers in order to provide the telephony functionality. Local area network 10 includes a network switching element 12 that receives and transmits information to one or more link interfaces 14. Each link interface 14 couples to a specific device within local area network 10 including an Interactive Voice Response (IVR) telephony server 16, a Private Branch Exchange (PBX) telephony servers 18, a computing station 20, a telephone 22, an Internet Protocol (IP) gateway 24, and a router 26. IP gateway 24 couples to a public switched telephone network (PSTN) 28 in order to pass calls between local area network 10 and PSTN 28. Router 26 provides an interface to an Information Service Provider (ISP) 30 for transfer of data to and from local area network 10.

PBX telephony server 18 includes the components that provide PBX call processing functionality. PBX telephony server 18 may include A and B servers that form a redundant protection pair to provide a backup capability in case one of the servers fails. Both A and B servers include the same components. Each component on the A server sends mirror events to corresponding counter-part components on the B server. If the A server should quit functioning, then the components on B server will take over. IP Telephones 22 provide the end user telephone function. Each telephone is controlled by an IP Telephone component running on the PBX telephony server 18. IP gateway 24 provides interfacing between the enterprise environment of local area network 10 and the circuit switched based environment of PSTN 28 and is controlled by a IP Gateway components running in the PBX telephony server 18. IVR telephony server 16 includes components for IVR applications. The components within the PBX telephony server 18 hands calls off to components in the IVR telephony server 16 according to a configuration which requires that the call be handled by an IVR application.

The unique telephony protocol provides a similar capability as the HTTP protocol, which allowed any vendor's browser to communicate with any other vendor's web server and the SMTP/POP protocols which allowed any vendor's email client to communicate with any other vendor's email server, but in the call processing environment. Distributed call processing among various servers is possible through the unique telephony protocol.

As shown, the invention can be specified as a unique telephony protocol, software components that communicate with this protocol, and techniques for configuring these components. A vendor can create a telephony application such as PBX, IVR, or ACD by creating a set of components that run on a single server or on multiple servers for redundancy/protection capabilities. Integration with other applications is accomplished by adding components to different servers. When a component is given a call, it controls all aspects of that call. The component can send/receive voice packets to the call, send/receive digits, pass call events on to other components, hand the call off to another component, or terminate the call. All components are equal and thus have the same capabilities. The invention enables an application's development environment to exist for telephony that is similar to mainstream enterprise software like database, web servers, and financial software. The enterprise customer can buy the telephony application from a vendor and, through third party add-ins, in-house customization, or integration with other enterprise software, create an application that works the way the enterprise desires and not the way the vendor wants.

Thus, it is apparent that there has been provided, in accordance with the present invention, a system and method for implementing telephony call control via a set of components that communicate with each other via a unique telephony protocol that satisfies the advantages set forth above. Although the present invention has been described in detail, it should be understood that various changes, substitutions, and alterations readily apparent to those skilled in the art may be made herein within departing from the spirit and scope of the present invention as defined by the following claims.

What is claimed is:

1. A telephony server comprising:
a plurality of component modules, wherein each component module is an independent piece of software that communicates using a telephony protocol, each component module being operable to
send events to corresponding others of the plurality of component modules, wherein each component module is associated with a component identifier, and an event is sent to a component module by associating the component module's component identifier with the event,
receive events from corresponding others of the plurality of component modules,
perform a telephony operation in response to receiving an event, wherein the telephony operations of the component modules are cooperatively operable to produce telephony applications, and
send an event in response to the telephony operation, wherein each component module is configured with information as to which of the plurality of component modules it communicates with.

2. The telephony server of claim 1, wherein the plurality of component modules includes:
a call component associated with a call, the call component operable to receive an initiate event indicating a start of the voice call;
a line component corresponding to a telephone line, the line component operable to receive the initiate event from the call component;
a phone component corresponding with a subscriber telephone, the subscriber telephone associated with the telephone line, the phone component operable to receive the initiate event from the line component, the phone component operable to commence ringing of the subscriber telephone in response to the initiate event.

3. The telephony server of claim 2, wherein the phone component is operable to send a progress ringing event to the line component indicating that the subscriber's telephone is ringing.

4. The telephony server of claim 2, wherein the phone component is operable to detect that the subscribers telephone is placed in an off-hook condition, the phone component being operable to send a connect event to the Line component indicating that the subscriber's telephone has been answered.

5. The telephony server of claim 4, wherein the line component is operable to send the connect event to the call component to initiate establishment of a communication path for the voice call.

6. The telephony server of claim 5, wherein the call component is operable to send an active event to the line component indicating that the communication path has been established for the voice call.

7. The telephony server of claim 6, wherein the line component is operable to send the active event to the phone component to allow voice communications to commence over the communication path.

8. The telephony server of claim 7, wherein the phone component is operable to detect that the subscriber's telephone is placed in an on-hook condition, the phone component being operable to send an idle event to the line component indicating an end of the voice call.

9. The telephony server of claim 8, wherein the line component is operable to send the idle event to the call component, to initiate tear down of the communication path and the call component.

10. The telephony server of claim 9, wherein the call component is dynamically created for the voice call.

11. A method of providing telephony functionality in a local area network, comprising;

establishing a line component within a telephony server of the local area network, the line component corresponding to a telephone line;

establishing a phone component within the telephony server, the phone component corresponding to a subscriber telephone, the subscriber telephone associated with the telephone line;

receiving an initiate event, the initiate event indicating a start of a voice call;

dynamically creating a call component within the telephony server, the call component associated with the voice call;

forwarding the initiate event from the call component to the phone component through the line component;

ringing the subscriber telephone in response to the initiate event being received at the phone component.

12. The method of claim 11, further comprising:

sending a progress ringing event from the phone component to the line and call components, the progress ringing event indicating that the subscriber telephone is ringing.

13. The method of claim 11, further comprising:

sending a connect event from the phone component to the line and call components, the connect event indicating that the subscriber telephone has been answered.

14. The method of claim 13, further comprising:

establishing a communication path for the voice call to the subscriber telephone.

15. The method of claim 14, further comprising:

sending an active event from the call component to the line and phone components, the active event indicating that the communication path has been established.

16. The method of claim 14, further comprising:

sending an idle event from the phone component to the line and call components, the idle event indicating that the subscriber telephone has been placed into an on-hook condition.

17. The method of claim 15, further comprising:

tearing down the communication path.

18. The method of claim 15, further comprising:

tearing down the call component.

19. The method of claim 11, further comprising:

establishing identical line, phone, and call components in a redundant server;

forwarding the initiate event to the redundant server;

transferring call control to the redundant server in response to a failure in the telephony server.

* * * * *